(12) United States Patent
Standish et al.

(10) Patent No.: US 7,443,915 B2
(45) Date of Patent: Oct. 28, 2008

(54) METHOD AND APPARATUS FOR PROVIDING OUT OF BAND COMMUNICATIONS OVER STRUCTURED CABLING

(75) Inventors: Ian Miles Standish, Flint (GB); David Niall MacFadyen, Chester (GB); James Joseph Eberle, Jr., Hummelstown, PA (US)

(73) Assignees: Tyco Electronics Corporation, Middletown, PA (US); Tyco Electronics UK Ltd., Swindon (GB)

( * ) Notice: Subject to any disclaimer, the term of this patent is extended or adjusted under 35 U.S.C. 154(b) by 737 days.

(21) Appl. No.: 10/999,637

(22) Filed: Nov. 30, 2004

(65) Prior Publication Data

US 2006/0115008 A1 Jun. 1, 2006

(51) Int. Cl.
*H04B 3/00* (2006.01)
*H04L 25/00* (2006.01)

(52) U.S. Cl. ............... 375/257; 375/222; 375/350; 324/76.29; 379/413.03

(58) Field of Classification Search ............... 375/222, 375/257, 258, 350; 324/76.29; 379/413.03
See application file for complete search history.

(56) References Cited

U.S. PATENT DOCUMENTS

| | | | |
|---|---|---|---|
| 3,718,767 A * | 2/1973 | Ellis | 370/496 |
| 5,483,467 A | 1/1996 | Krupka et al. | |
| 5,577,069 A | 11/1996 | Lau et al. | 375/242 |
| 5,930,340 A * | 7/1999 | Bell | 379/93.08 |
| 5,994,998 A | 11/1999 | Fisher et al. | |
| 6,473,608 B1 | 10/2002 | Lehr et al. | |
| 6,574,586 B1 | 6/2003 | David et al. | |
| 6,643,566 B1 | 11/2003 | Lehr et al. | |
| 6,658,010 B1 | 12/2003 | Enns et al. | 370/401 |
| 6,707,305 B2 * | 3/2004 | Johnson et al. | 324/542 |
| 2004/0049321 A1 | 3/2004 | Lehr et al. | 700/286 |
| 2004/0073597 A1 | 4/2004 | Caveney et al. | 709/200 |

FOREIGN PATENT DOCUMENTS

| | | |
|---|---|---|
| EP | 0 967 736 | 12/1999 |
| WO | WO 00/74280 | 12/2000 |

* cited by examiner

*Primary Examiner*—Ted Wang

(57) ABSTRACT

An out of band communications apparatus includes first and second data lines arranged in a differential pair. The data lines convey high speed data within a first frequency range and out of band data within a second frequency range that differs from the first frequency range. The apparatus also includes a band pass filter coupled to the first and second data lines. The filter only passes the out of band data and blocks the high speed data. The apparatus also includes a device coupled to the band pass filter and configured to at least one of transmit and receive out of band data.

22 Claims, 8 Drawing Sheets

METHOD AND APPARATUS FOR PROVIDING OUT OF BAND COMMUNICATIONS OVER STRUCTURED CABLING

BACKGROUND OF THE INVENTION

This invention relates generally to communication infrastructures, and more particularly, to methods and apparatus for providing out of band communications over structured cabling.

Structured cabling is generally known and in wide use in networked infrastructures. Structured cabling schemes are governed, at least in part, by the 802.3af standard developed by the Institute of Electrical and Electronic Engineers (IEEE). The 802.3af standard relates to the use of structured cabling to deliver both direct current (DC) power and high speed data, such as Ethernet data, over a common cable.

At least some known structured cabling systems transmit the high speed data at a frequency that ranges above approximately 100 kilohertz (kHz). During operation, the high speed data is transmitted through a filter such that the signals having frequencies below approximately 100 kHz are blocked from further transmission. Accordingly, only the high speed data is allowed to pass through the filter to a communication system, while the signals at lower frequencies are filtered out. However, heretofore, these known structured cabling systems have only supported two types of content, namely, DC power and high speed data.

At least some other known structured cabling systems provide additional wiring in the structured cabling system to transmit data through the infrastructure. For example, at least one known system includes an additional wire for transmitting data relating to the interconnection of the components in the structured cabling system.

Accordingly, a need exists to expand the capacity of structured cabling systems in a cost effective and reliable manner. For example, a need exists to expand the capacity of structured cabling systems without re-wiring the existing infrastructure and without providing additional wiring to the infrastructure.

BRIEF DESCRIPTION OF THE INVENTION

In accordance with an embodiment of the present invention, an out of band communications apparatus has been developed that includes first and second data lines arranged in a differential pair. The data lines convey high speed data within a first frequency range and out of band data within a second frequency range that differs from the first frequency range. The apparatus also includes a band pass filter coupled to the first and second data lines. The filter only passes the out of band data and blocks the high speed data. The apparatus also includes a device coupled to said band pass filter and configured to at least one of transmit and receive out of band data.

Certain embodiments of the present invention may also include a transformer having a center power tap for one of adding and removing power from the first and second data lines. Alternatively, the filter may include a digital signal processor and an analog to digital converter configured to convert the out of band data to a digital signal.

Certain other embodiments of the present invention may also include a filter configured to pass frequencies below 100 kilohertz. Optionally, the second frequency range of the apparatus may be between 100 hertz and 100 kilohertz. Alternatively, the second frequency range of the apparatus may be between 100 hertz and 20 kilohertz.

DETAILED DESCRIPTION OF THE INVENTION

Figure 1:
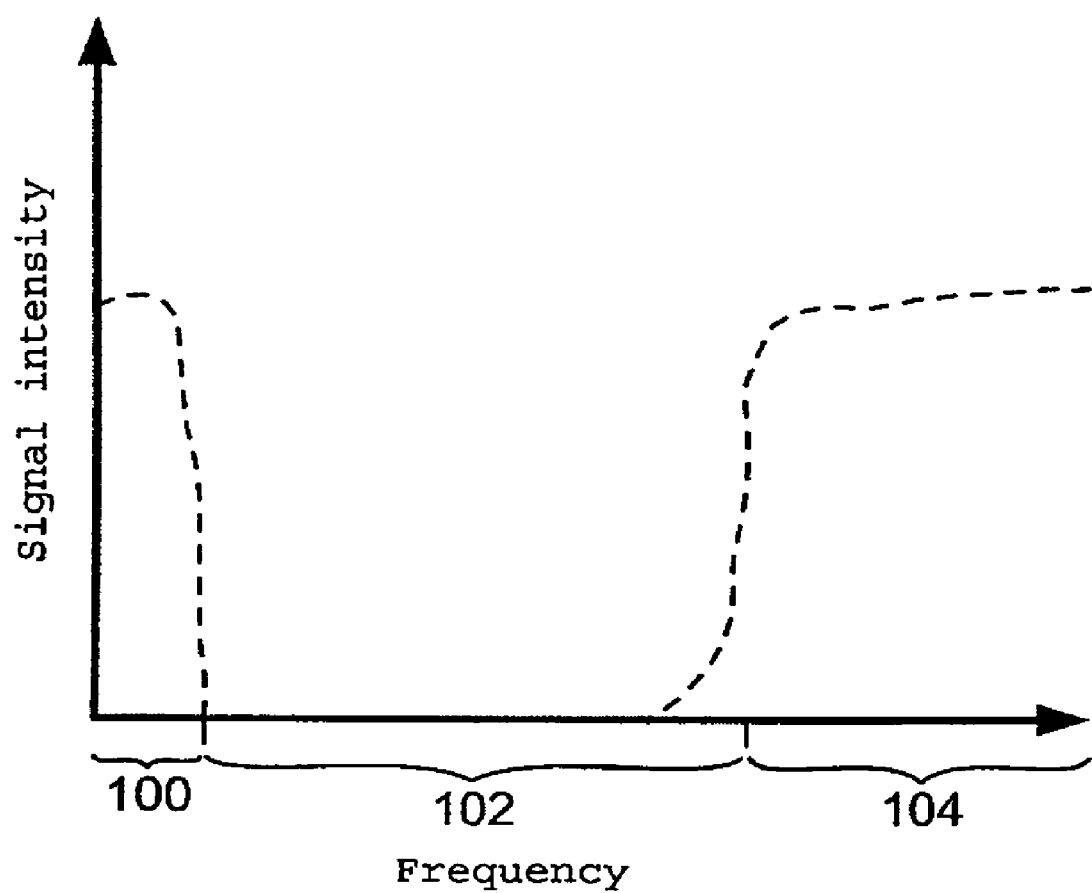
FIG. 1 is a schematic diagram illustrating the transmission frequency range of an out of band communications apparatus.

FIG. 1 illustrates a transmission frequency range of an out of band communications apparatus, such as, for example, a structured data cable. The frequency is shown along the X-axis of the graph, and the signal intensity is shown along the Y-axis of the graph. As indicated in FIG. 1, the frequency range is divided into a low frequency range 100, a mid frequency range 102, and a high frequency range 104. The low frequency range 100 is generally used for power transmission, such as, for example, direct current (DC) power, which has a frequency of 0 Hertz (Hz), or alternating current (AC) power, which has a frequency of approximately 50 Hz or 60 Hz. As such, the low frequency range 100 is typically between 0 Hz and approximately 100 Hz. In the graph of FIG. 1, signals are being transmitted in the low frequency range 100 and in the high frequency range 104.

The high frequency range 104 is generally used for high speed data transmission, such as, for example, Ethernet data transmission. The Institute of Electrical and Electronic Engineers (IEEE) has developed the 802.3af standard governing Power over Ethernet (PoE) whereby a single cable is used to deliver both power and high speed data to a user. A filter is used to extract the high speed data from the cable. Specifically, the filter has a predetermined cut-off frequency which blocks the transmission of frequency below a predetermined amount, such as, for example, 100 kilohertz (kHz). As such, under the 802.3af specification, the high speed data is transmitted at a frequency above the cut-off frequency, and any transmission below the cut-off frequency is filtered out as noise.

The mid frequency range 102 represents the frequency spectrum between the requirements of the low frequency range 100 and the high frequency range 104. In accordance with certain embodiments, the mid-frequency range 102 may carry out of band data for a variety of applications. Optionally, the out of band data carried over the mid frequency range 102 may be voice data. Additionally, the mid frequency range 102 may be used to transmit out of band power or secondary power. In one embodiment, the mid frequency range 102 is between approximately 100 Hz and 100 kHz. In another embodiment, the mid frequency range 102 is between approximately 100 Hz and 20 kHz to reduce the interference with the high speed data transmitted in the high frequency range 104. In yet another embodiment, the mid frequency range 102 is between approximately 65 kHz and 100 kHz to allow out of band communications above digital voice data that is transmitted at approximately 64 kHz.

Figure 2:
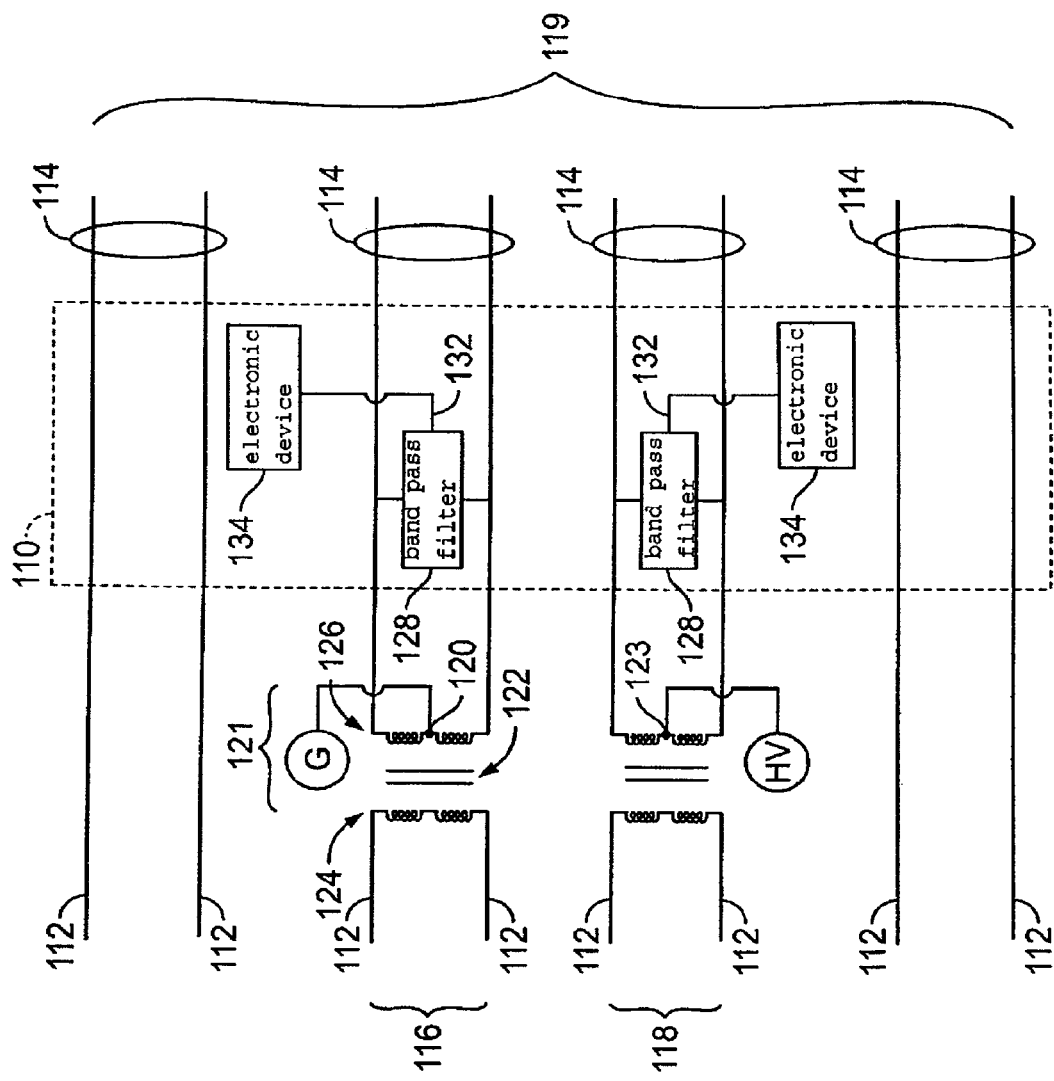
FIG. 2 illustrates an out of band power and data tap of a communications apparatus in accordance with an embodiment of the present invention.

FIG. 2 illustrates an out of band power and data tap of an out of band communications apparatus 110. As illustrated in FIG. 2, the apparatus 110 includes a plurality of data lines or wires 112. In one embodiment, the apparatus 110 includes a high speed data cable, such as, for example a Category 5e (CAT-5) cable, that includes eight data lines 112. Alternatively, the apparatus 110 may include more or less than eight data lines 112. The data lines 112 may be single ended, or alternatively, may be a differential pair 114. In the illustrative embodiment, the data lines 112 are set up as a transmit pair 116 and a receive pair 118.

Power may be added to the apparatus 110 using an end span device, such as, by way of example only, an Ethernet switch. In another embodiment, power may be added to the apparatus 110 using a mid span device. The end span device or the mid span device may pass power to the same lines 112 that carry the data or onto spare lines 112 in the same cable assembly 119 that are not being used to carry data.

In one embodiment, the power may be added as illustrated in FIG. 2. Specifically, the power is added through a center tap 120 of a transformer 121. The transformer 121 includes a core 122 between a primary winding 124 and a secondary winding 126. The center tap 120 of the transmit pair 116 may be connected to ground, such that zero volts are supplied to the transmit pair 116. High voltage (HV) power may be connected to a center tap 123 of the receive pair 118, such that a positive voltage is supplied to the receive pair 118. In one embodiment, a voltage of approximately 48 V is supplied to the receive pair 118. Alternatively, more or less than 48 V may be supplied to the receive pair 118.

A band pass filter 128 is coupled to the data lines 112 to filter out the out of band data transmitted along the apparatus 110 while allowing the power and the high speed data to remain on the apparatus 110. In one embodiment, the band pass filter 128 is coupled to the data lines 112 in each differential pair 114. The band pass filter 128 allows the out of band data, or the data transmitted along the data lines 112 having a frequency in the mid frequency range 102, to pass through the filter 128. The band pass filter 128 does not allow the high speed data, or the data transmitted along the data lines 112 having a frequency in the high frequency range 104, to pass through the filter 128. Accordingly, the out of band data is filtered from the high speed data and removed from the apparatus 110. In one embodiment, the band pass filter 128 has a predetermined cut-off frequency to differentiate between the out of band data and the high speed data. In one embodiment, the cut-off frequency is approximately 100 kHz. Alternatively, the cut-off frequency is approximately 20 kHz. The cut-off frequency may be alternatively determined based on the particular application for the apparatus 110 and for the particular transmission frequency of the out of band data. In one embodiment, the band pass filter 128 includes at least one inductor (not shown), coupled to the data lines 112, to filter the out of band data from the apparatus 110. Specifically, the cut-off frequency for the filter 128 is attained by providing an inductor having a predetermined inductance to filter the out of band data transmitted on the apparatus 110 at a predetermined frequency that corresponds to the predetermined inductance.

The band pass filter 128 is coupled to an out of band communications electronic device 134 for transmitting and/or receiving data signals. In one embodiment, the band pass filter 128 transmits an output 132 to the out of band communications electronic device 134. The output 132 relates to the filtered signal that is passed through the band pass filter 128. Optionally, the out of band communications electronic device 134 may be an analyzer that interprets the output 132 from the band pass filter 128. The analyzer may be operatively coupled to a controller (not shown) for performing a specified function relating to the out of band data, such as, for example, infrastructure mapping. In another embodiment, the out of band communications electronic device 134 transmits a signal to the band pass filter 128, and the band pass filter 128 transmits the signal along the data wires 112.

Other examples of the use of the apparatus 110 include coupling light emitting diode (LED) indicators to the apparatus 110 for indicating the flow or availability of data or power on the apparatus 110. Other examples of the use of the apparatus 110 include supplying power to non-af compliant devices, or supplying power over the mid frequency range to desktop equipment, such as, for example, a computer or a monitor. In one embodiment, the apparatus 110 may be used to transmit a video signal from a monitor in the high frequency range 104, a keyboard and/or a mouse signal on the mid frequency range 102, and power for the devices on the low frequency range 100.

Other examples of the use of the apparatus 110 include coupling the apparatus 110 to a sensor for sensing an occurrence, such as motion, light, or smoke, wherein a signal relating to the occurrence is transmitted as out of band data along the apparatus 110. Other examples of the use of the apparatus 110 include determining the access rights based on user information contained within an end device coupled to the apparatus 110. Optionally, data or power transmission through the apparatus 110 to the end device can be granted or denied based on the user information transmitted through the apparatus 110 as out of band data.

Figure 3:
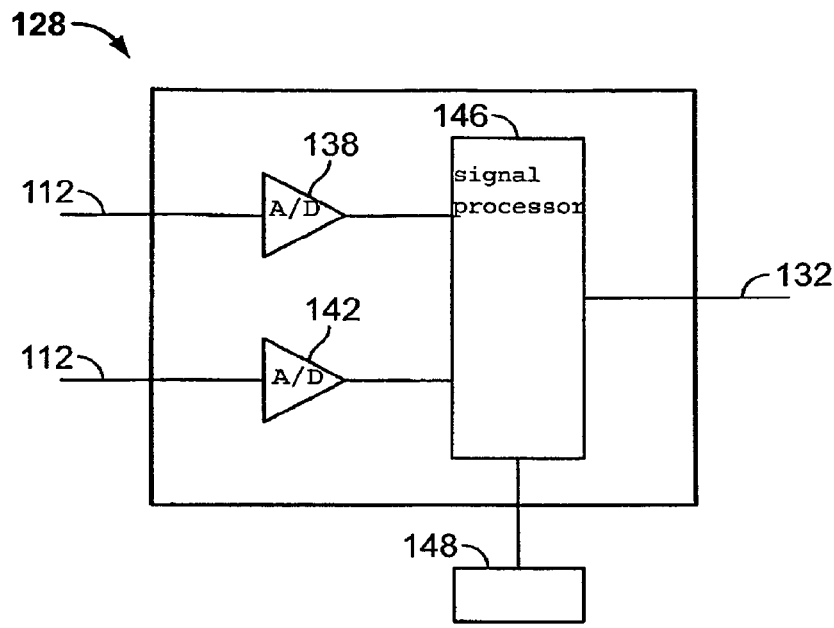
FIG. 3 illustrates a digital band pass filter that may be used with the communications apparatus shown in FIG. 2.

FIG. 3 illustrates a digital band pass filter 128 that may be used with the communications apparatus 110 (FIG. 2). The digital band pass filter 128 includes a first analog to digital (A/D) converter 138 coupled to one of the data lines 112 and a second A/D converter 142 coupled to another of the data lines 112. The A/D converters 138 and 142 convert the analog signals transmitted on the data lines 112 to digital signals. The digital signals are then transmitted to a digital signal processor 146. The digital signal processor 146 receives the digital signals from the A/D converters 138 and 142, and receives a predetermined coefficient from a coefficient input 148 to provide the output 132. The output 132 relates to the out of band data transmitted on the apparatus 110. The output 132 may be sent to the out of band communications electronic device 134 (FIG. 2).

Figure 4:
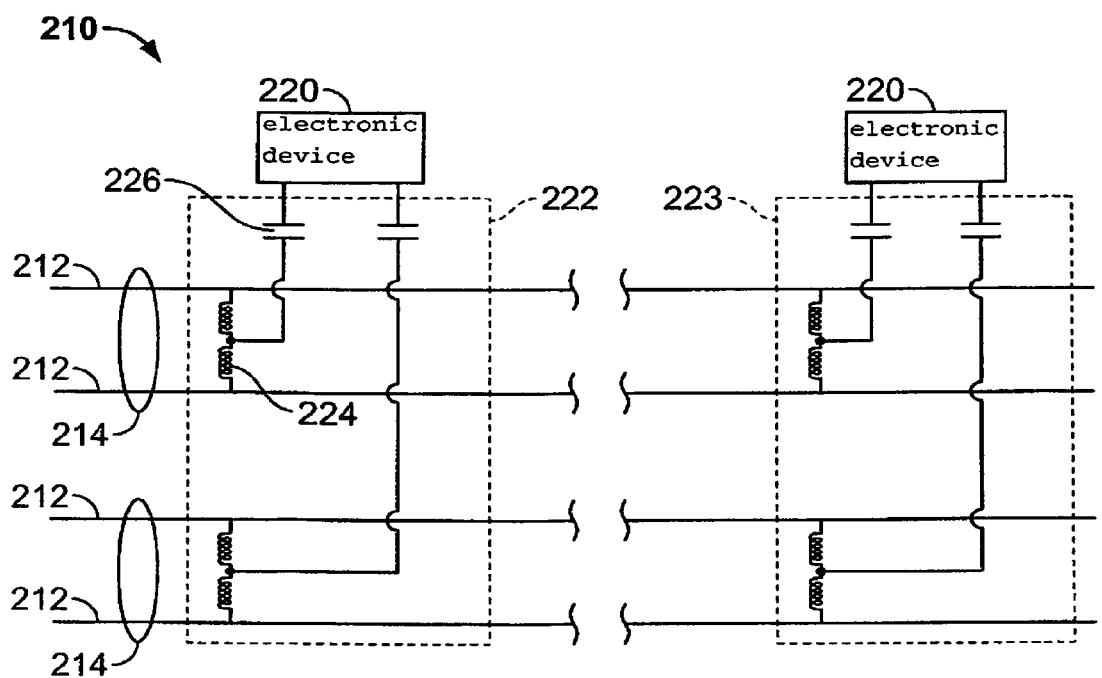
FIG. 4 is a schematic illustration of an alternative embodiment of a communications apparatus for the addition and/or removal of out of band data.

FIG. 4 is a schematic illustration of an alternative embodiment of an apparatus 210 for the addition and/or removal of out of band data. The out of band data may be added and/or removed at multiple points along the apparatus 210 by band pass filters 222 and/or 223 and the out of band communications electronic devices 220. The out of band communications electronic devices 220 may be mid span devices or end span devices. In one embodiment, the out of band communications electronic device 220 is included in an end span device such as, for example, an Ethernet switch. In such embodiment, the Ethernet switch does not transmit Ethernet data along the apparatus 210 until the out of band communications electronic devices 220 receives an out of band data signal providing authentication for the switch to transmit the Ethernet data.

In one embodiment, a band pass filter 222, such as, for example, an LC circuit is coupled to the data lines 212 in each differential pair 214. The LC circuit includes at least one inductor 224 coupled to the data lines 212 and a capacitor 226 between the inductor 224 and the out of band communications electronic device 220. Optionally, the filter 222 has a cut-off frequency attained by providing the inductor 224 with a predetermined inductance to filter the out of band data having a corresponding frequency transmitted on the apparatus 210. Alternatively, the band pass filter 222 may include an RLC circuit having a resistor (not shown), at least one inductor 224 coupled to the data lines 212, and a capacitor 226 between the inductor 224 and the out of band communications electronic device 220. In operation, the out of band communications electronic device 220 adds the out of band data to the data lines 212 by transmitting an out of band data signal through the band pass filter 222 and onto the data lines 212. Additionally, the out of band data is removed from the data lines 212 by the band pass filter 222 passing the signals to the out of band communications electronic device 220.

Figure 5:
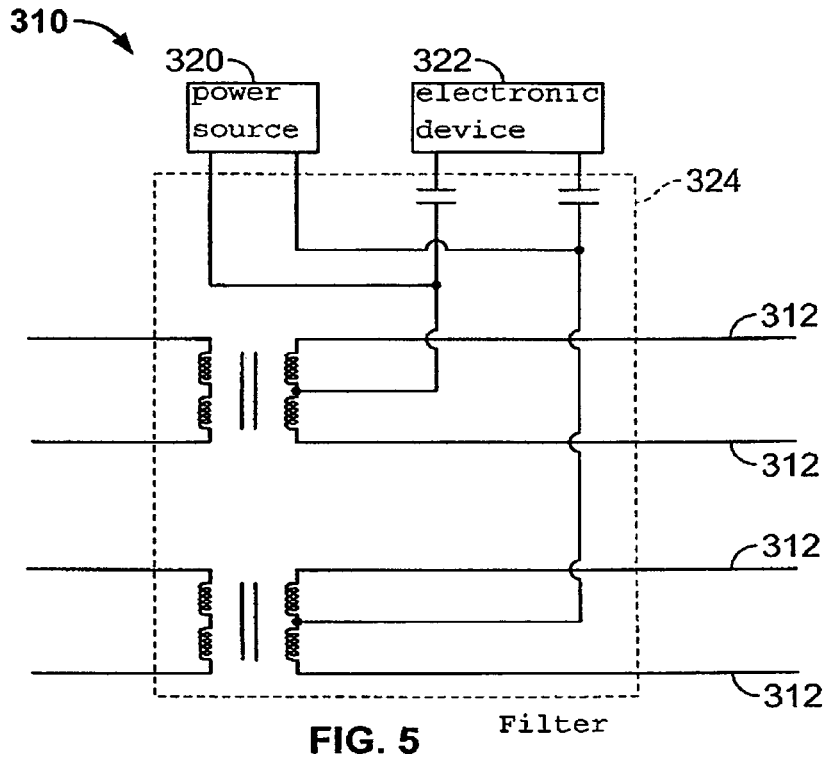
FIG. 5 is a schematic illustration of an alternative embodiment of a communications apparatus for the addition and/or removal of out of band data.

FIG. 5 is a schematic illustration of an alternative embodiment of an apparatus 310 for the addition and/or removal of out of band data. In one embodiment, both power and data may be added or removed from the data lines 312 at the same point, such as at an end span device (not shown). Power is added to the data lines 312 by a power source 320, such as, for example, a DC power source, that is coupled to the data lines 312. The power is removed from the data lines 312 downstream by an electronic device (not shown), such as, for example, a wall outlet, a mid span device, or an end span device. The out of band data may be added and/or removed by an out of band communications electronic device 322 at the same point where power is added to the data lines 312. Specifically, in the illustrative embodiment shown in FIG. 5, the out of band data is passed through a filter 324 when being added to, or removed from, the data lines 312. However, the out of band data may be passed through another type of filter, such as, by way of example only, an RLC filter or a digital filter.

Figure 6:
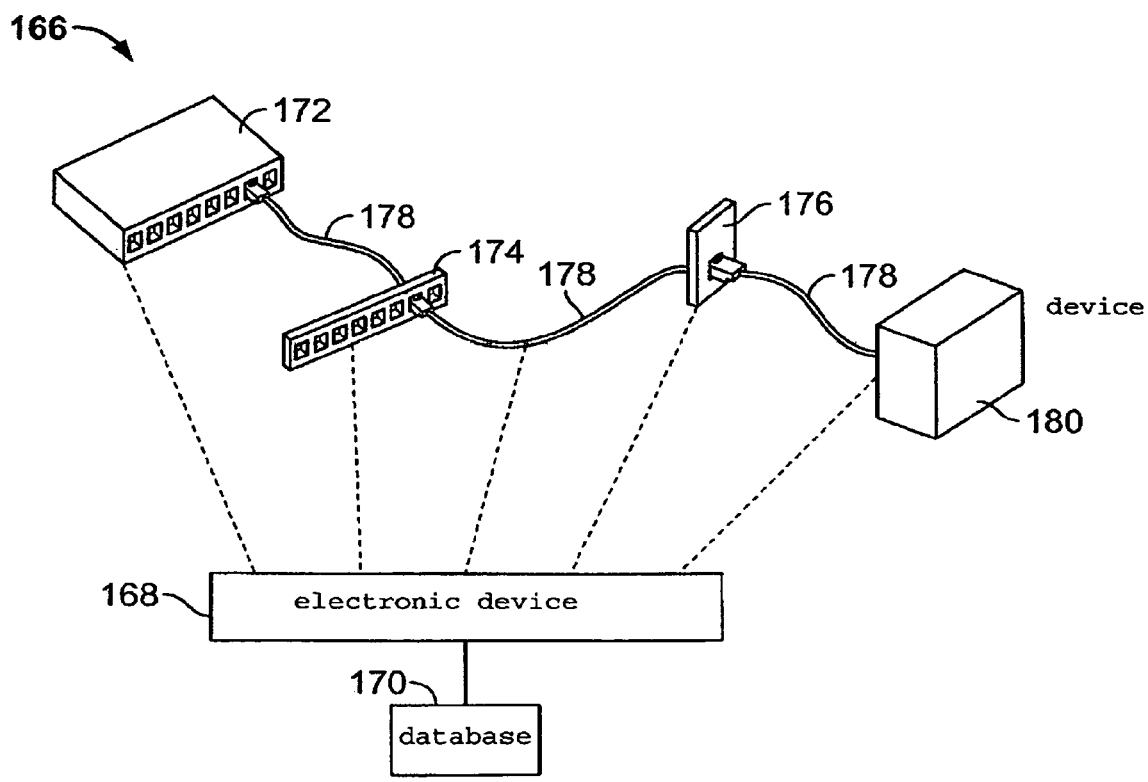
FIG. 6 illustrates an exemplary use of the communications apparatus shown in FIG. 2 for data transmission in accordance with an embodiment of the present invention.

FIG. 6 is a schematic illustration of an exemplary use of the out of band communications apparatus 110 (FIG. 2) for data transmission in a structured cabling infrastructure 166. It is recognized that the infrastructure 166 may have many configurations, depending on the application. The infrastructure 166 shown in FIG. 6 is for illustrative purposes only. In one embodiment, the infrastructure 166 includes an out of band communications electronic device 168, such as, for example, an analyzer or controller, for controlling and/or monitoring the out of band communications apparatus 110. The out of band communications electronic device 168 is coupled to a central database 170. The infrastructure 166 also includes a switch 172, a patch panel 174, a wall outlet 176, and a multitude of structured cables 178 interconnecting the components. An end device 180 is coupled to the infrastructure 166 via a patch cord or that is coupled to the wall outlet 176. Alternatively, the end device 180 may be a wireless device. The wall outlet 176 is coupled to the patch panel 174 via a fixed cable, and the patch panel 174 is coupled to the switch 172 via a patch cord. Alternatively, the switch 172 may be coupled to the patch panel 174 via a fixed cable. In one embodiment, the patch panel 174 and/or the wall outlet 176 is an active device. Alternatively, the patch panel 174 and/or the wall outlet 176 may be a passive device. In alternative embodiments, the infrastructure 166 may include multiple wall outlets 176, patch panels 174 and switches 172. In other alternative embodiments, the infrastructure 166 may not include any switches 172, patch panels 174, or wall outlets 176.

The out of band communications electronic device 168 may be connected to any of the switch 172, the patch panel 174, the structured cabling 178, the wall outlet 176 or the end device 180, depending on the infrastructure 166 of the particular application. Optionally, the out of band communications electronic device 168 may be integrated or embedded with any of the switch 172, the patch panel 174, the structured cabling 178, the wall outlet 176 or the end device 180. In the exemplary embodiment, the out of band communications electronic device 168 generates and interprets out of band data. Specifically, the out of band communications electronic device 168 generates out of band data relating to the specified application and transmits the data along the structured cabling 178 to one of the components in the infrastructure 166. Additionally, the out of band communications electronic device 168 receives out of band data relating to the specified application from the components in the infrastructure 166 and interprets the data that is transmitted.

Figure 7:
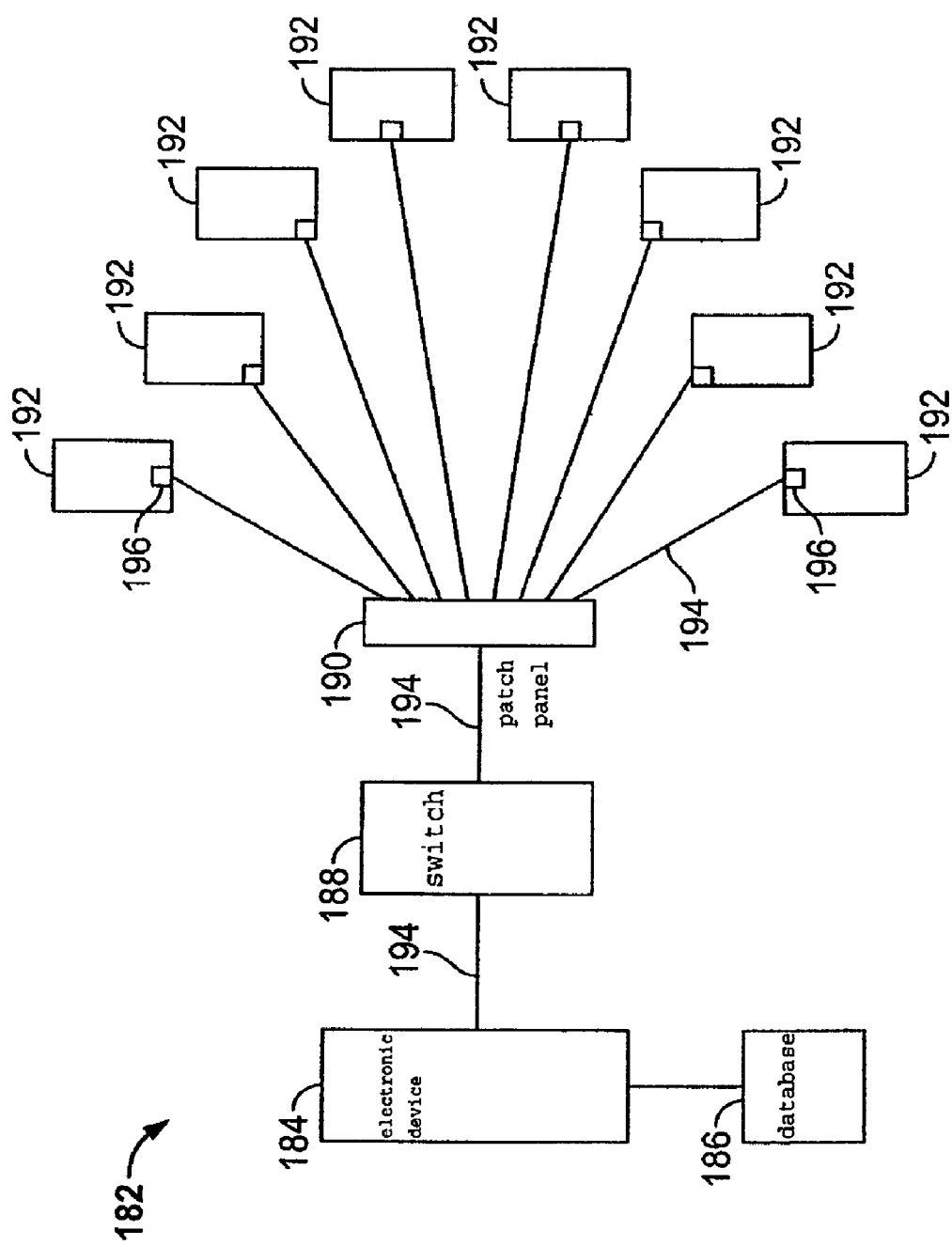
FIG. 7 illustrates another exemplary use of the communications apparatus shown in FIG. 2.

FIG. 7 is a schematic illustration of an exemplary use of the out of band communications apparatus 110 (FIG. 2) for managing an infrastructure 182. The infrastructure 182 illustrated in FIG. 7 is for illustrative purposes only. In one embodiment, the infrastructure 182 includes an out of band communications electronic device 184, such as, for example, an analyzer or controller, for controlling and/or monitoring the out of band communications apparatus 110. The out of band communications electronic device 184 is coupled to a central database 186. The infrastructure 182 may include at least one switch 188, at least one patch panel 190, at least one wall outlet 192, and a multitude of structured cables 194 interconnecting the components. Optionally, the out of band communications electronic device 184 may be integrated or embedded with any of the switch 188, the patch panel 190, the wall outlet 192, or the structured cabling 194.

In use, it is desirable for the status of each component in the infrastructure 182 to be determined. For example, in one embodiment, the status may be related to the location of the component, such that the location is determined for proper operation, testing and/or repair of the infrastructure 182. Specifically, the location of each wall outlet 192, and the specific port that the cables 194 from the wall outlets 192 are connected through must be known. With the use of the out of band communications apparatus 110, the location of the components can be automatically monitored by the out of band communications electronic device 184 and stored in the central database 186. In another embodiment, the status may be related to the operating state of the component. In yet another embodiment, the status may be related to the type of component. In one embodiment, the out of band communications electronic device 184 polls the component to determine the status of such component by transmitting an out of band data signal along the apparatus 110 to the component.

In the exemplary embodiment, the wall outlets 192 include an identification indicator 196, such as, for example, an identification tag, that is coupled to the structured cable 194. The identification indicator 196 includes a unique identifier, such as, for example, a serial number stored in a memory that may be transmitted along the structured cable 194. Optionally, the identification indicator 196 may be powered by the power transmitted along the structured cable. The out of band communications electronic device 184 polls the individual identification indicators 196 to transmit a signal relating to the specific identification of the wall outlet 192. The signal is transmitted as out of band data along the structured cable 194 through the infrastructure 182 to the out of band communications electronic device 184. The out of band communications electronic device 184 interprets the location and routing of the structured cable 194 through the infrastructure 182. Specifically, the out of band communications electronic device 184 determines the cable connectivity through any patch panels 190 and/or switches 188. Accordingly, the out of band communications electronic device 184 links the physical location of the wall outlet 192 on the office floor with the cable route through the infrastructure 182. Once the location of the wall outlet 192 is determined, the location is stored in the central database 186. The cable connectivity with the patch panels 190 and the switches 188 can be determined in a similar manner.

Figure 8:
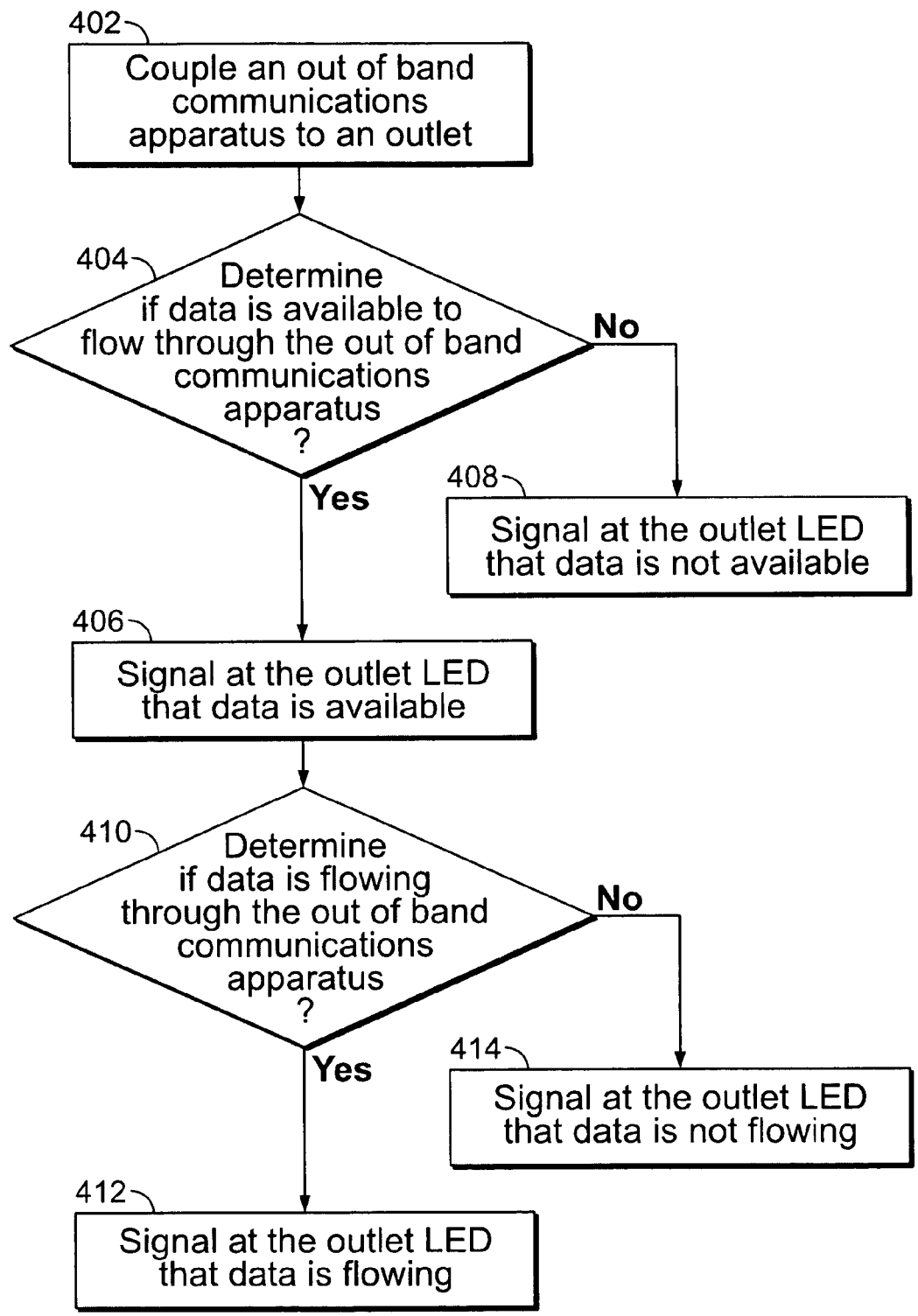
FIG. 8 is a flow diagram illustrating exemplary uses of an out of band communications apparatus in accordance with an embodiment of the present invention.

FIG. 8 is a flow diagram illustrating exemplary uses of the out of band communications apparatus 110 (FIG. 2). Specifically, the out of band communications apparatus 110 may be used to indicate the transmission status of the apparatus 110. For example, the apparatus 110 may be used to indicate if data is being transmitted through the apparatus 110. Alternatively, the apparatus 110 may be used to indicate if power is being transmitted on the data wires 112. Optionally, the apparatus 110 may be used to indicate if power or data is capable of being transmitted through the apparatus 110. Additionally, the apparatus 110 may be used to indicate if a patch cord is electrically coupled to the apparatus 110, such that data or power may flow through the apparatus 110 to the patch cord and an end device.

In one embodiment, the status of the apparatus 110 is transmitted from the wall outlet to an out of band communications electronic device 134 for monitoring the infrastructure such as, for example, monitoring the transmission status of the individual apparatus 110. Specifically, a signal relating to the status of the apparatus 110 is transmitted through the apparatus 110 in the mid frequency range 102 as out of band data. The out of band communications electronic device 134 determines if data is flowing through the apparatus 110 to or from an end device. Specifically, a signal is transmitted in the mid frequency range 102 as out of band data relating to the flow of high speed data through the apparatus 110. Optionally, the out of band communications electronic device 134 determines if power is flowing through the apparatus 110, and a signal relating to such is transmitted as out of band data.

In an exemplary use, the apparatus 110 is coupled to a wall outlet 402. The wall outlet has an indication system, such as, for example, a light emitting diode (LED) indicator, or an LCD display that is capable of sending text or visual messages to a user. The apparatus 110 is coupled to the LED indicators such that data flowing on the apparatus 110 may be transmitted to the LED indicator. Optionally, the LED indicator may be powered by the power transmitted on the apparatus 110. The LED indicator indicates the availability of high speed data transmission through the apparatus 110. Specifically, the out of band communications electronic device 134 determines 404 if data is available to flow through the apparatus 110. The LED indicator is illuminated when the apparatus coupled to the wall outlet is transmitting data 412, or is capable of transmitting data 406. Optionally, the wall outlet may include a plurality of LED indicators, wherein a first LED indicator is illuminated if data transmission is possible 406 and a second LED indicator is illuminated if data transmission is not possible 408 through the cable coupled to the particular wall outlet. Alternatively, the LED indicator may indicate the availability of a power transmission through the apparatus 110.

In one embodiment, in addition to determining 404 if data is available to flow through the apparatus 110, the out of band communications electronic device 134 determines 410 if data is flowing through the apparatus 110. An LED indicator may be illuminated 412 if data is flowing through the apparatus 110 or an LED indicator may be illuminated 414 if data is not flowing through the cable coupled to the particular wall outlet.

In another embodiment, the apparatus 110 is coupled to a patch panel, such as patch panel 174 (FIG. 6). The out of band communications apparatus 110 is used to indicate the transmission status of the apparatus 110 at the patch panel 174. Optionally, the apparatus 110 may be coupled to a switch, such as switch 172 (FIG. 6), and the out of band communications apparatus 110 is used to indicate the transmission status of the apparatus 110 at the switch 172. Specifically, the patch panel 174 or the switch 172 includes the LED indicators, and the signal relating to the transmission status of the apparatus 110 is sent to, and communicated by, the patch panel 174 or the switch 172.

In yet another embodiment, a patch cord is electrically coupled to the apparatus 110. In one embodiment, the patch cord is coupled to a wall outlet. Alternatively, the patch cord may be coupled between patch panels, or between a patch panel and a switch. The patch cord includes an illumination source, such as an LED indicator or a lighted end. The transmission status of the apparatus 110 may be indicated on the patch cord. Specifically, the illumination source is illuminated when a predetermined transmission status is performed by the apparatus 110, such as data or power availability, or data or power transmission through the apparatus 110.

Figure 9:
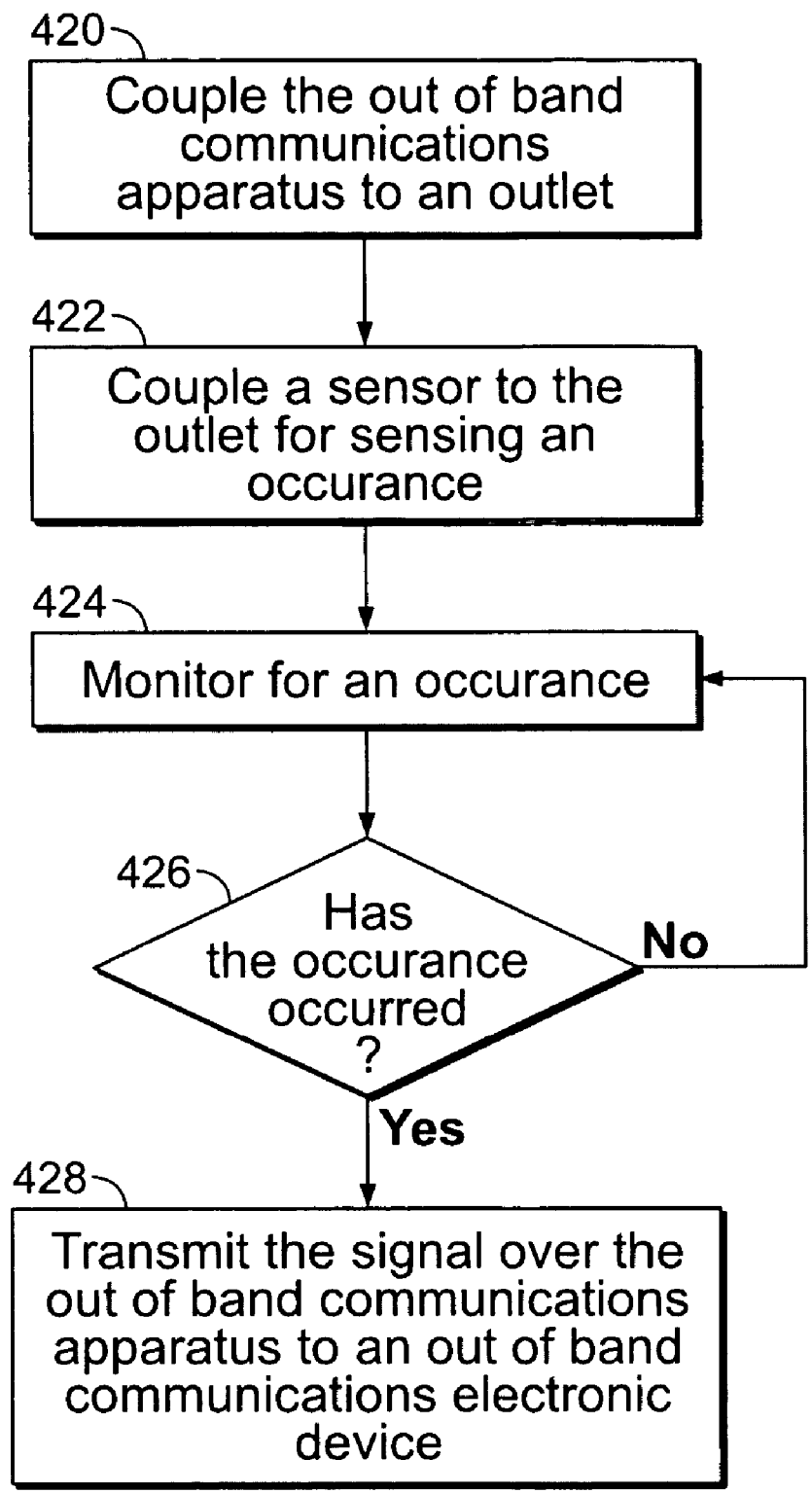
FIG. 9 is a flow diagram illustrating an exemplary use of an out of band communications apparatus in accordance with an embodiment of the present invention.

FIG. 9 is a flow diagram illustrating an exemplary use of the out of band communications apparatus 110 (FIG. 2). The out of band communications apparatus 110 may be used to monitor for an occurrence. In one embodiment, the apparatus 110 is coupled to a wall outlet 420, and a sensor is coupled to a wall outlet 422 for sensing an occurrence, such as, for example, the state of the vicinity surrounding the outlet. For example, the sensor may include a smoke detector, a carbon monoxide detector, and/or a heat detector for detecting an occurrence, such as, by way of example only, a fire. Alternatively, the sensor may include a motion detector, a light detector, and/or a noise detector for detecting an occurrence, such as, but not limited to, the presence of a burglar or an intruder. The sensor monitors for the occurrence 424, and when the occurrence is detected by the sensor 426, the sensor transmits 428 a signal to an out of band communications electronic device 134 (FIG. 2) indicating that the occurrence has been detected. The signal is transmitted in the mid frequency range 102 as out of band data relating to the occurrence. As such, the signal transmitted may be unrelated to the signals transmitted through the cable in the low and/or high frequency ranges 100 and/or 104, such as the power and high speed data transmissions.

In another embodiment, the sensor may be operatively coupled to an end device. For example, the sensor may include a motion detector, and the sensor may be operatively coupled to a light control, such that the lights turn on when motion is detected by the sensor. In yet another example, the sensor may include a smoke detector, and the sensor may be operatively coupled to an alarm control such that the alarm turns on when smoke is detected by the sensor.

Figure 10:
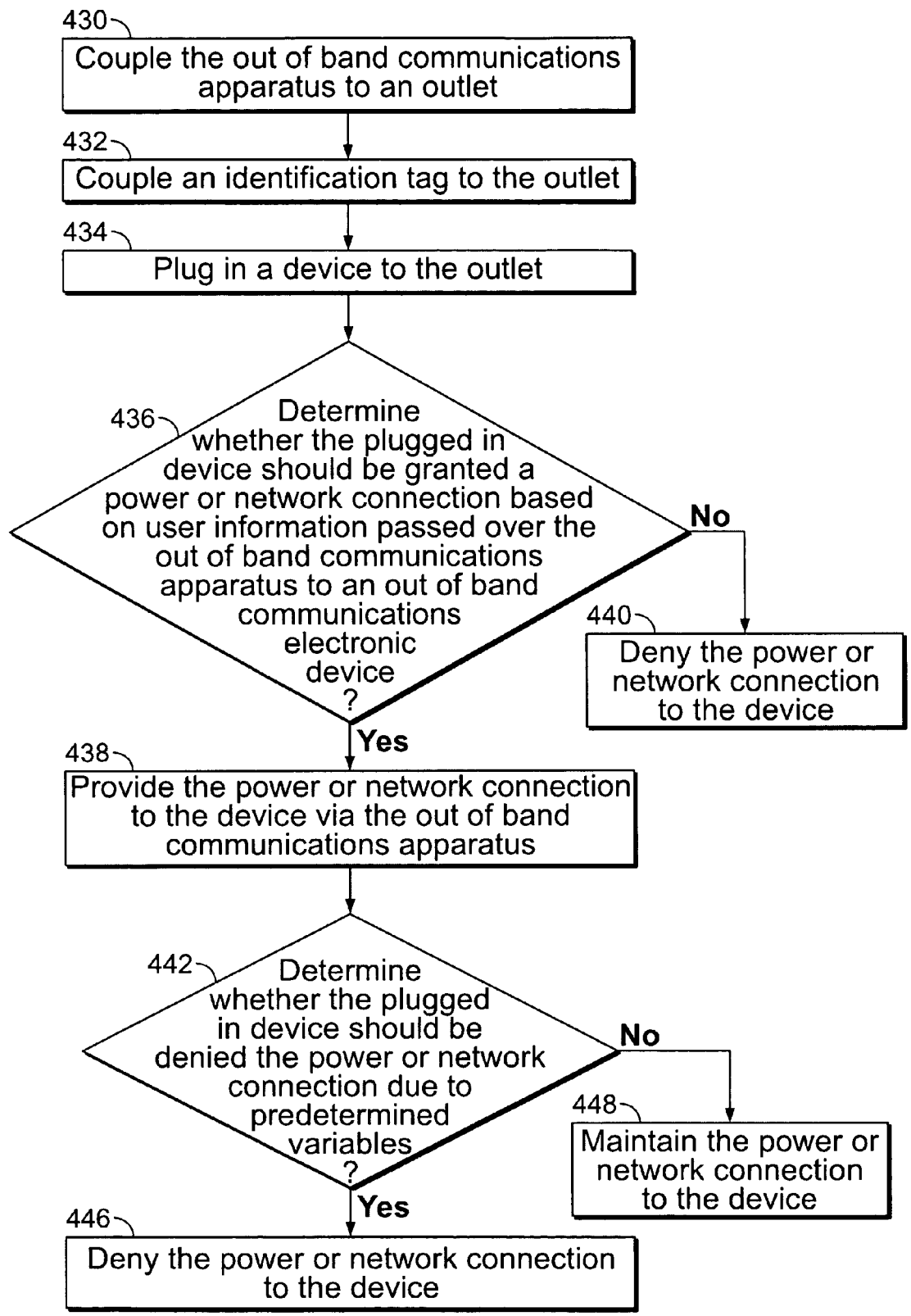
FIG. 10 is a flow diagram illustrating an exemplary use of an out of band communications apparatus in accordance with an embodiment of the present invention.

FIG. 10 is a flow diagram illustrating an exemplary use of the out of band communications apparatus 110 (FIG. 2). The out of band communications apparatus 110 may be used to grant data or power access to an end device based on user information transmitted on the apparatus 110. In one embodiment, the apparatus 110 is coupled 430 to a wall outlet. An identification indicator is coupled 432 to the wall outlet, and the apparatus 110 is coupled to the identification indicator. Additionally, the end device is coupled 434 to the wall outlet. The end device includes user information based on predetermined variables such as, for example, the type of end device or the use of the end device. An out of band communications electronic device 134 (FIG. 2) determines 436 if the end device should be granted a network or power connection based on the user information contained within the end device. The data or power transmission is provided 438 if the user information allows the data or power transmission. Alternatively, the data or power transmission is denied 440 if the user information restricts access to the particular end device. Optionally, the out of band communications electronic device 134 may determine the location of the wall outlet in the structured cabling infrastructure such that the location of the end device is known.

In operation, when the end device is coupled to the wall outlet, the end device transmits a signal to the out of band communications electronic device based on the user information. The signal is transmitted in the mid frequency range 102 as out of band data relating to the access rights of the particular end device to a network or power transmission through the apparatus 110. In one embodiment, the end device may be an electronic device, such as, for example, a computer. The user information transmitted on the apparatus 110 is security information relating to the access rights for the particular electronic device. As such, a network connection can be denied to a particular end device based on security information transmitted as out of band data from the end device to the out of band communications electronic device 134.

In another embodiment, the end device may be a piece of data gathering equipment, such as, for example, a heart monitor in a hospital. Alternatively, the end device may be a piece of controlling equipment, such as, for example, an industrial controller in a factory. The user information transmitted on the apparatus 110 is information relating to the type of end device or the location of the end device. As such, the out of band communications electronic device 134 transmits data or power on the apparatus 110 to the end device when the out of band communications electronic device 134 determines that the end device is of a particular type, or in a particular location, or in a particular state.

In a further embodiment, the device 134 monitors transmissions to the end device and determines 442 if the end device should be denied data and/or power transmission due to predetermined variables. As such, a power or network connection may be denied 446 to the end device or may be maintained 448 based on the predetermined variables. Accordingly, the apparatus 110 may deny a data or power transmission to the end device after transmissions have been occurring. In one example, the apparatus 110 may deny data or power to the end device based on security information transmitted on the apparatus 110. Alternatively, the apparatus 110 may deny data or power to the end device based on a priority scheme or preference to another end device, such as, for example, when a power supply is limited, or when transmission of data or power would be unsafe. As such, the transmission of power in the low frequency range 100, or the transmission of high speed data in the high frequency range 104 may be controlled by the transmission of data in the mid frequency range 102.

The above-described embodiments provide a cost effective and reliable means for transmitting power and data on a communications apparatus 110. Specifically, the apparatus 110 includes data lines for conveying high speed data within a high frequency range 104 and out of band data within a mid frequency range 102 that differs from the high frequency range 104. The apparatus 110 is also configured to convey power on the data lines 112. The apparatus 110 also includes a band pass filter 128 coupled to the data lines 112 for passing the out of band data and blocking the high speed data. The apparatus 110 also includes an output 132 joined to the band pass filter 128 for outputting the out of band data to an out of band communications electronic device 134. Accordingly, the apparatus 110 is an improvement over typical structured cables that merely convey high speed data and power. As a result, the apparatus 110 is configured for use in multiple applications. Additionally, the apparatus 110 can be used with an existing structured cable infrastructure.

Exemplary embodiments of a communications apparatus 110 are described above in detail. The communications apparatus 110 is not limited to the specific embodiments described herein, but rather, components of each communications apparatus 110 may be utilized independently and separately from other components described herein. For example, each communications apparatus 110 component can also be used in combination with other communications apparatus 110 components.

While the invention has been described in terms of various specific embodiments, those skilled in the art will recognize that the invention can be practiced with modification within the spirit and scope of the claims.

What is claimed is:

1. An out of band communications apparatus comprising:
first and second data lines arranged in a differential pair and conveying high speed data within a first frequency range and out of band data within a second frequency range that differs from said first frequency range;
a band pass filter coupled to said first and second data lines only passing said out of band data and blocking said high speed data; and
a device coupled to said band pass filter configured to at least one of transmit and receive out of band data.

2. The apparatus in accordance with claim 1, wherein said first and second data lines simultaneously convey power.

3. The apparatus in accordance with claim 1, further comprising a transformer having a center power tap for one of adding and removing power from said first and second data lines.

4. The apparatus in accordance with claim 1, wherein said filter is configured to pass frequencies below 100 kilohertz.

5. The apparatus in accordance with claim 1, wherein said second frequency range is between 100 hertz and 100 kilohertz.

6. The apparatus in accordance with claim 1, wherein said second frequency range is between 100 hertz and 20 kilohertz.

7. The apparatus in accordance with claim 1, wherein said first and second data lines are configured to convey multiple out of band data signals within the second frequency range.

8. The apparatus in accordance with claim 1, wherein said filter comprises a circuit including at least one inductor and a capacitor, wherein said inductor has a predetermined impedance.

9. The apparatus in accordance with claim 1, wherein said filter comprises a circuit including a resistor, at least one inductor and a capacitor, wherein said inductor has a predetermined impedance.

10. The apparatus in accordance with claim 1, wherein said apparatus is configured to be coupled to an out of band communications electronic device.

11. The apparatus in accordance with claim 10, wherein said filter comprises a digital signal processor configured to pass the out of band data between said apparatus and the out of band communications electronic device.

12. The apparatus in accordance with claim 1, wherein said filter comprises a digital signal processor and at least one analog to digital converter configured to convert the out of band data to a digital signal.

13. A method for managing a structured cabling infrastructure using an out of band communications apparatus, wherein the infrastructure includes at least one apparatus, each apparatus includes first and second data lines arranged in a differential pair and conveying high speed data within a first frequency range and out of band data within a second frequency range that differs from the first frequency range, said method comprising:
- coupling the data lines to an identification indicator, wherein the identification indicator is positioned within the infrastructure;
- coupling a band pass filter to the first and second data lines, wherein the band pass filter is configured to pass out of band data and block high speed data;
- providing an out of band communications electronic device, wherein the out of band communications electronic device is configured to generate and interpret out of band data; and
- transmitting an out of band data signal from the identification indicator to the out of band communications electronic device via the data lines, wherein the out of band data signal relates to the status of the identification indicator.

14. The method in accordance with claim 13, wherein the electronic identification indicator is coupled to a wall outlet, said coupling the data lines comprises ending the data lines at the wall outlet.

15. The method in accordance with claim 13, wherein filtering the out of band data comprises passing the out of band data within the second frequency range to the out of band communications electronic device.

16. The method in accordance with claim 13, further comprising generating an infrastructure map based on the out of band data signal transmitted from the identification indicator.

17. The method in accordance with claim 13, further comprising polling the identification indicator with a signal from the out of band communications electronic device.

18. A method for indicating the transmission status of an out of band communications apparatus, wherein the out of band communications apparatus includes first and second data lines arranged in a differential pair and conveying high speed data within a first frequency range and out of band data within a second frequency range that differs from the first frequency range, the out of band communications apparatus is also configured to transmit power along the data lines, said method comprising:
- coupling the data lines to at least one illumination source;
- coupling a band pass filter to the first and second data lines, wherein the band pass filter is configured to pass out of band data and block high speed data;
- providing an out of band communications electronic device, wherein the out of band communications electronic device is configured to generate and interpret out of band data;
- transmitting an out of band data signal from the out of band communications electronic device to the illumination source via the data lines, wherein the out of band data signal relates to the transmission status of the out of band communications apparatus.

19. The method in accordance with claim 18, wherein the illumination source is an LED indicator.

20. The method in accordance with claim 18, wherein the transmission status relates to the transmission of data on the data lines.

21. The method in accordance with claim 18, wherein the transmission status relates to the transmission of power on the data lines.

22. The method in accordance with claim 18, further comprising coupling the illumination source to one of a wall outlet, a patch panel, a switch, and a patch cord such that the transmission status of the out of band conununications apparatus is indicated at the corresponding wall outlet, patch panel, switch, and patch cord to which the illumination source is coupled.

* * * * *